United States Patent
Chu et al.

(10) Patent No.: US 9,183,095 B1
(45) Date of Patent: Nov. 10, 2015

(54) RECOVERING FROM A PROGRAM FAILURE BY COMBINING WRITE DATA

(71) Applicant: SK hynix memory solutions inc., San Jose, CA (US)

(72) Inventors: Derrick Preston Chu, Santa Clara, CA (US); Nandan Sridhar, Santa Clara, CA (US); Ameen Aslam, Santa Clara, CA (US)

(73) Assignee: SK hynix memory solutions inc., San Jose, CA (US)

( * ) Notice: Subject to any disclaimer, the term of this patent is extended or adjusted under 35 U.S.C. 154(b) by 104 days.

(21) Appl. No.: 14/094,648

(22) Filed: Dec. 2, 2013

Related U.S. Application Data

(60) Provisional application No. 61/840,683, filed on Jun. 28, 2013.

(51) Int. Cl.
*G06F 11/00* (2006.01)
*G06F 11/14* (2006.01)

(52) U.S. Cl.
CPC .................................. *G06F 11/1458* (2013.01)

(58) Field of Classification Search
CPC .................................................. G06F 11/1458
See application file for complete search history.

(56) References Cited

U.S. PATENT DOCUMENTS

| | | | |
|---|---|---|---|
| 5,432,800 A | 7/1995 | Kuroda et al. | |
| 5,684,915 A | 11/1997 | Ueda et al. | |
| 5,856,890 A | 1/1999 | Hamai et al. | |
| 7,296,209 B2 | 11/2007 | Katayama et al. | |
| 7,904,780 B2 | 3/2011 | Brandman | |
| 7,904,793 B2 | 3/2011 | Mokhlesi et al. | |
| 7,966,546 B2 | 6/2011 | Mokhlesi et al. | |
| 7,966,550 B2 | 6/2011 | Mokhlesi et al. | |
| 8,261,170 B2 | 9/2012 | Yedidia et al. | |
| 8,301,979 B2 | 10/2012 | Sharon et al. | |
| 8,335,977 B2 | 12/2012 | Weingarten et al. | |
| 8,621,321 B2 | 12/2013 | Steiner et al. | |
| 8,949,684 B1 | 2/2015 | Shalvi et al. | |
| 2004/0261001 A1 | 12/2004 | Chang et al. | |
| 2006/0015791 A1 | 1/2006 | Kikuchi et al. | |
| 2007/0104300 A1 | 5/2007 | Esumi et al. | |
| 2007/0124657 A1 | 5/2007 | Orio | |
| 2007/0171714 A1 | 7/2007 | Wu et al. | |
| 2007/0283214 A1 | 12/2007 | Lasser | |
| 2008/0244360 A1 | 10/2008 | Mokhlesi et al. | |
| 2008/0276156 A1 | 11/2008 | Gunnam et al. | |
| 2008/0301521 A1 | 12/2008 | Gunnam et al. | |
| 2009/0070656 A1 | 3/2009 | Jo et al. | |
| 2009/0199069 A1 | 8/2009 | Palanki et al. | |
| 2011/0004812 A1 | 1/2011 | Yang | |

(Continued)

OTHER PUBLICATIONS

Park et al., "Reliability and Performance Enhancement Technique for SSD array storage system using RAID mechanism", ISCIT 2009, IEEE, 2009.

(Continued)

*Primary Examiner* — Joshua P Lottich
(74) *Attorney, Agent, or Firm* — Van Pelt, Yi & James LLP

(57) ABSTRACT

A plurality of write data is received and combined to obtain backup write data. The plurality of write data is stored in storage. On a storage controller, the plurality of write data is released without waiting for a confirmation associated with writing the plurality of write data to the storage. The backup write data is stored.

21 Claims, 9 Drawing Sheets

(56) References Cited

U.S. PATENT DOCUMENTS

| | | |
|---|---|---|
| 2011/0072331 A1 | 3/2011 | Sakaue et al. |
| 2011/0231738 A1 | 9/2011 | Horisaki |
| 2011/0258514 A1 | 10/2011 | Lasser |
| 2011/0296280 A1 | 12/2011 | Achir et al. |
| 2012/0110417 A1 | 5/2012 | D' Abreu et al. |
| 2012/0159282 A1 | 6/2012 | Ito |

OTHER PUBLICATIONS

Blaum et al., "EVENODD: An Efficient Scheme for Tolerating Double Disk Failures in RAID Architectures", IEEE Transactions on Computers, Feb. 1995, vol. 44, No. 2.

Fossorier et al., "Reduced Complexity Iterative Decoding of Low-Density Parity Check Codes Based on Belief Propagation", IEEE Transactions on Communications, May 1999, vol. 47, No. 5.

RECOVERING FROM A PROGRAM FAILURE BY COMBINING WRITE DATA

CROSS REFERENCE TO OTHER APPLICATIONS

This application claims priority to U.S. Provisional Patent Application No. 61/840,683 entitled METHOD FOR RECOVERING PROGRAM ERRORS IN NAND FLASH MEMORY DEVICES filed Jun. 28, 2013 which is incorporated herein by reference for all purposes.

BACKGROUND OF THE INVENTION

When a storage controller issues a write instruction (also referred to as a program instruction) to solid state storage (e.g., NAND Flash), the solid state storage is sometimes unable to successfully commit the write data. This is referred to as a failure to program or a program failure. Although a straightforward solution is for the storage controller to save write data until that write data has been successfully committed to solid state storage, this is an unattractive solution because of the amount of storage required. For example, although it only takes on the order of hundreds of microseconds for the storage controller to send the write instruction to the solid state storage, it actually takes on the order of milliseconds for the solid state storage to perform the write (successfully or not). Meanwhile, a host may be transferring 500 Mbs of write data to the storage controller. The bottleneck is therefore at the solid state storage. Storing all of the write data would require the storage controller to save large amounts of information. When solid state storage systems (e.g., which include the storage controller and solid state storage) are used in low cost systems, the higher cost associated with larger amounts of DRAM or SRAM to store write data is unattractive. New techniques to recover from program failure which require less storage would be desirable.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
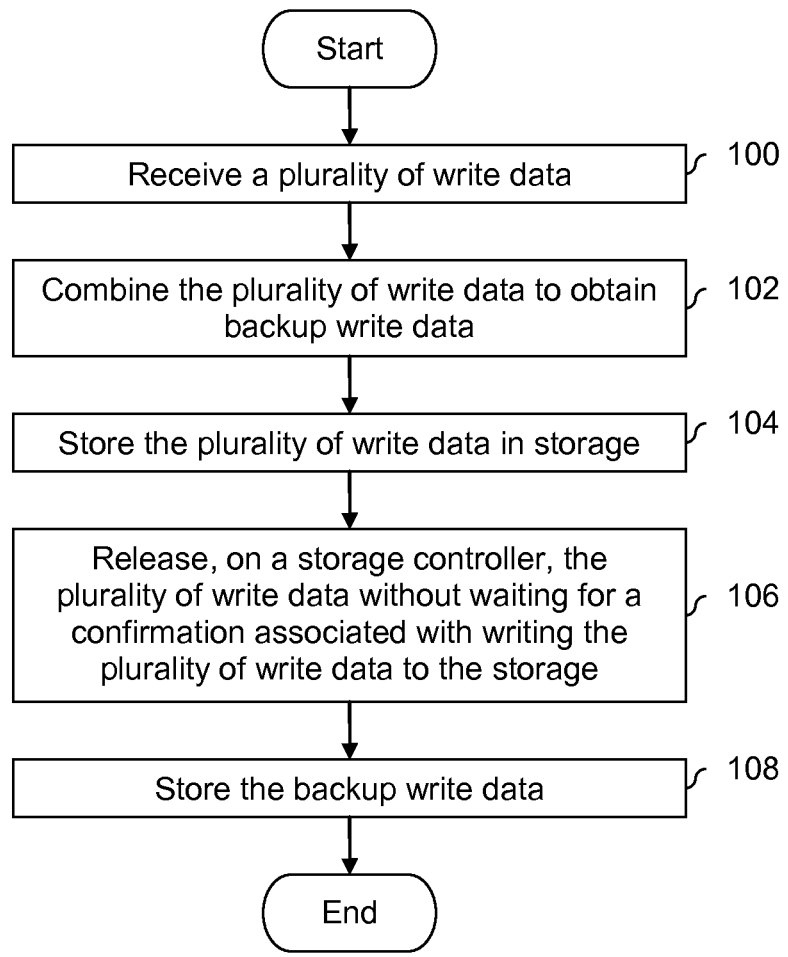
FIG. 1 is a flowchart illustrating an embodiment of a process for generating write data which is used to recover from a program failure, if needed.

FIG. 1 is a flowchart illustrating an embodiment of a process for generating write data which is used to recover from a program failure, if needed. In some embodiments, the process is performed by a write controller. In some embodiments, a write controller which performs the process shown is implemented on a semiconductor device, such as a field-programmable gate array (FPGA) or an application-specific integrated circuit (ASIC).

At 100, a plurality of write data is received. In some solid state storage systems, a write controller performs error correction encoding (e.g., low-density parity-check (LDPC) encoding) on write data before it is written to solid state storage. In some embodiments, the write data which is received at 100 has not yet been error correction encoded. In some embodiments, the write data received at 100 is not received together in a batch (e.g., there are gaps in time between some of the write data and/or there is some write data (used to generate first backup write data) which is interleaved with other write data (used to generate second backup write data)).

At 102, the plurality of write data is combined to obtain backup write data. For example, if N pieces of write data are received at 100, the N pieces of write data may be combined using an exclusive OR (XOR) operation to obtain backup write data which is the same length as each of the N pieces of write data. In some embodiments, some other combination technique besides XOR is used.

In some embodiments, the backup write data is generated incrementally at step 102. For example, suppose write data is received piece by piece, as opposed to being received in a bunch. In one example, the backup write data is initialized to the zero vector (i.e., $x^0=(0, \ldots, 0)$). After the first write data (i.e., $w^0$) is received, the backup write data is updated to be $x^1=XOR(x^0, w^0)$. After the second write data (i.e., $w^1$) is received, the backup write data is updated to be $x^2=XOR(x^1, w^1)$. This incremental combination continues until $x^N$ is obtained.

In some embodiments, there are N pieces of write data in the plurality which are combined together at step 102. In some embodiments, N corresponds to the size of a super-block, which is the maximum number of write requests that may operate in parallel. In one example, a storage system permits up to eight writes to different semiconductor dice at the same time and (correspondingly) eight pieces of write data are combined together at step 102.

In some embodiments, the exemplary process will start new backup write data, even if there is still space in some backup write data which is only partially completed. For example, suppose backup write data is generated using eight pieces of write data and four pieces of write data have already been received so there is space for four more pieces of write data. Furthermore, suppose that a super-block write comes in with eight pieces of write data. Although the system could "close out" the partially-completed backup write data with four of the pieces of write data from the super-block and then start new backup write data with the remaining four pieces of write data from the super-block, in some embodiments new backup write data is created using all eight pieces of write data from the super-block. In such embodiments, the partially-completed backup write data simply waits for the next write data.

At 104, the plurality of write data is stored in storage. For example, in a solid state storage system, the plurality of write data is written to solid state storage (e.g., external storage on some other semiconductor die and/or in some other semiconductor package). In some embodiments where the write data is not received together in a batch (e.g., the write data is received piece by piece with gaps between the write data), writing at step 104 begins without waiting for all write data to be received at step 100 (e.g., as each piece of write data is received and after being used to update the backup write data).

At 106, the plurality of write data is released, on a storage controller, without waiting for a confirmation associated with writing the plurality of write data to the storage. For example, a write controller may not necessarily wait for the storage to confirm whether or not one or more pieces of write data in the plurality have been successfully programmed (or not). In one example, releasing at step 106 comprises making the memory or storage (in which the plurality of write data is stored) available for re-use. In other words, releasing at step 106 does not necessarily mean that the memory or storage (in which the plurality of write data is stored) is actually overwritten with new information.

At 108, the backup write data is stored. In various embodiments, the backup write data is stored in internal memory on the write controller or is stored externally on the same storage as the plurality of write data. In some embodiments, where the backup write data is stored at step 108 depends upon the application. Some examples are described in further detail below.

In some embodiments, prior to storing at step 104 and/or step 108, error correction encoding is performed on the plurality of write data and/or the backup write data. In some such embodiments, the backup write data is generated at step 102 using write data which is not yet error correction encoded.

Figure 2:
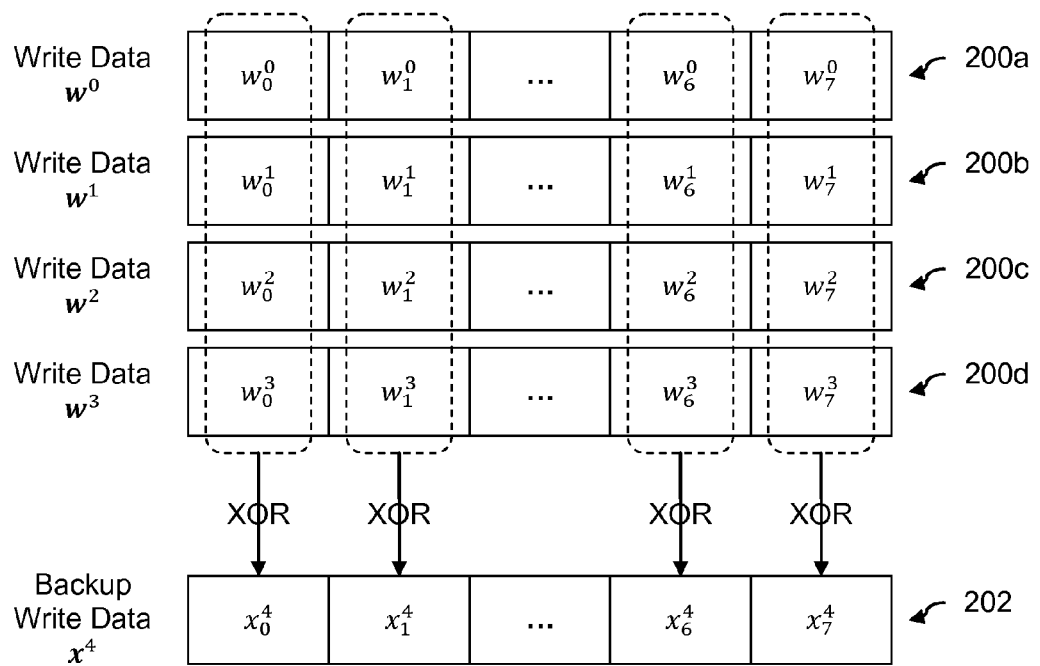
FIG. 2 is a diagram illustrating an embodiment of backup write data.

FIG. 2 is a diagram illustrating an embodiment of backup write data. In the example shown, N=4 where N is the number of pieces of write data which are being combined to generate the write data. Write data 200a-200d ($w^0, w^1, w^2, w^3$) is an example of a plurality of write data which is received at step 100 and combined at step 102 in FIG. 1. As described above, write data 200a-200d may not necessarily be received together in a batch. Each one of write data 200a-200d has a length of m (i.e., m=8 in this example) bits and in this example has not yet been processed by an error correction encoder (e.g., so that write data 200a-200d does not include any parity information or checksum).

In this example, write data 200a-200d is combined using an XOR process to obtain backup write data (i.e., $x^4$) 202. As shown in the figure, the first bits from write data (i.e., ($w_0^0, w_0^1, w_0^2, w_0^3$)) 200a-200d are XORed to obtain the first bit in the backup write data (i.e., $x_0^N$ where n=4 in this example). Similarly, the second bits from write data 200a-200d (i.e., ($w_1^0, w_1^1, w_1^2, w_1^3$) are XORed to obtain the first bit in the backup write data (i.e., $x_1^N$ where n=4 in this example) and so on.

In embodiments such as this one where an XOR is used to generate the backup write data, it may be desirable to pick write data to combine which is independent with respect to program failures in order to achieve the best performance. With an XOR, at most one write in the group of N write data can have a program failure. For example, if both write data 200a and 200b both have a program failure, then recovery using backup write data 202 is not possible. To reduce the likelihood of that occurring, the interdependencies of a given storage system are taken into consideration when deciding what write data to combine to obtain backup write data at step 102. Some examples of this are described in the following figure.

Figure 3A:
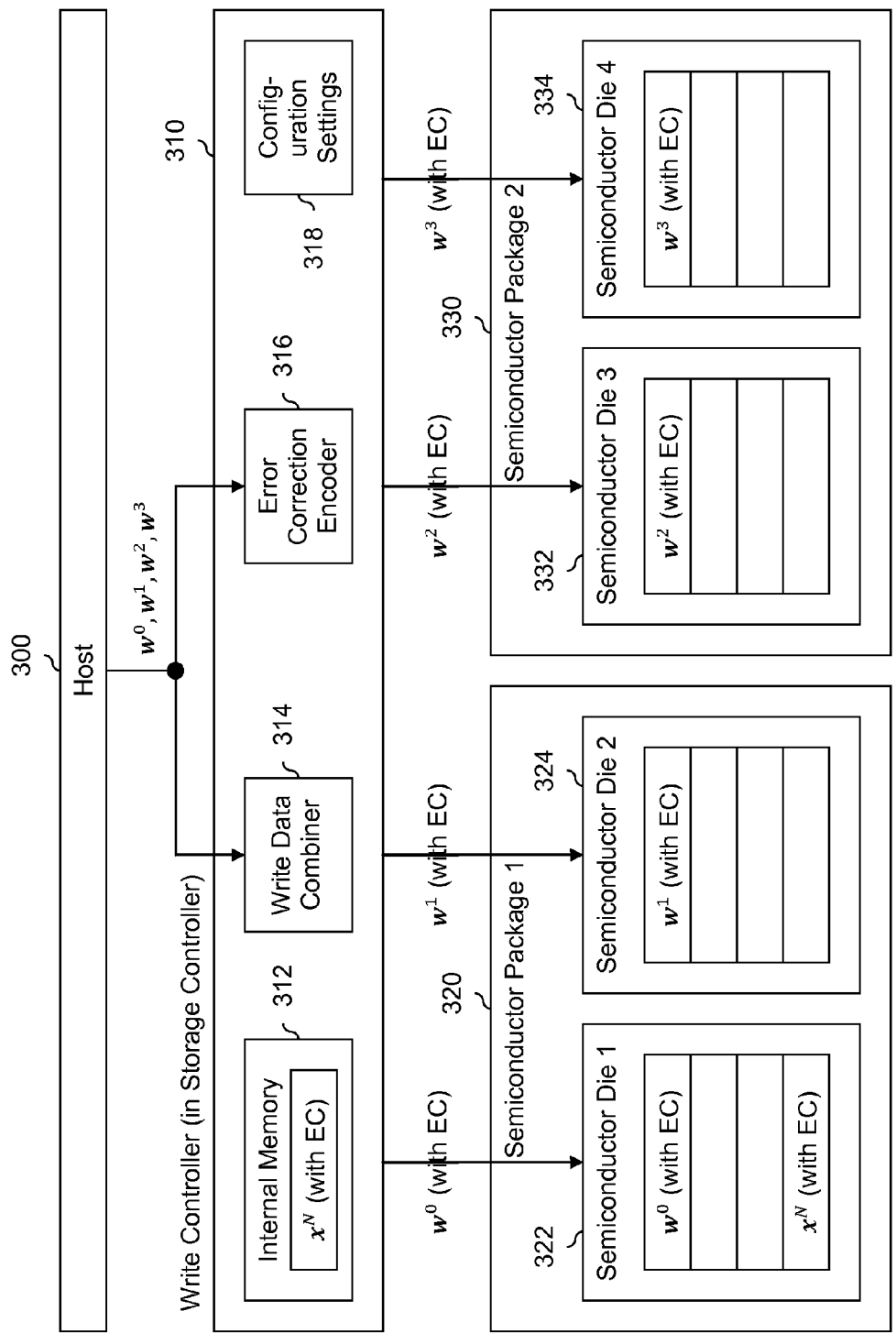
FIG. 3A is a system diagram showing an embodiment of a write controller which generates backup write data.

FIG. 3A is a system diagram showing an embodiment of a write controller which generates backup write data. In some embodiments, write controller 310 performs the process described in FIG. 1. Write controller 310 is included in a storage controller (not shown) which writes to and reads from some storage (e.g., solid state storage such as NAND Flash). For clarity, components not related to the technique are not shown in this example. Naturally, this is not intended to be limiting. For example, although a read controller is not shown, the techniques described herein may be used in a storage controller which includes both a read controller and a write controller.

Host 300 sends write data ($w^0, w^0, w^2, w^3$) to write controller 310, which is included in a storage controller (not shown). In some embodiments, host 300 is implemented as firmware and a storage controller (which includes write controller 310) is implemented on a semiconductor device, such as an ASIC or an FPGA. In this particular example, it cannot be assumed that host 300 keeps a backup copy of the write data, so if a program failure occurs it is not an option for write controller 310 to ask host 300 to re-transmit the write data.

The write data is passed to write data combiner 314 in write controller 310. Write data combiner 314 combines the write data together to generate backup write data (x"). In this particular example, the backup write data is error correction encoded before storage using error correction encoder 316 to produce backup write data with error correction encoding applied.

In some embodiments, the backup write data (with error correction encoding applied) is stored in internal memory 312. In some embodiments, internal memory 312 is also used to store the write data temporarily (e.g., until error correction encoder 316, write data combiner 314, and any other components no longer require the write data). In various embodiments, internal memory 312 comprises SRAM or DRAM.

Alternatively, in some other embodiments, the backup write data is stored in one of semiconductor packages/dice. In this particular example, the backup write data (with error correction encoding applied) is alternatively shown as being stored in semiconductor die 322.

The decision about where to store backup write data (e.g., on internal memory 312 or externally like on semiconductor die 322 as shown in this example) may be application dependent. For example, using internal memory to store backup write data may require a write controller to include larger amounts of SRAM or DRAM, which adds to the cost. In cost-sensitive applications (e.g., consumer products, such as mobile telephones), it may be desirable to store backup write data on external storage (e.g., external solid state storage on which the write data is also stored).

However, storing backup write data on external storage adversely affects the write performance of solid state storage systems. In some applications, write performance may be affected to an unacceptable degree. Adding backup write data to the queue of things to be written to solid state storage introduces even more delay into the time required to (e.g., user or host) write data which follows the backup write data. In high performance applications (e.g., enterprise applications), this delay may be unacceptable. In such applications, it may be preferable to have a more expensive write controller (e.g., which has larger SRAM or DRAM to store backup write data) so that write performance is not sacrificed.

The write data from host 300 is also passed to error correction encoder 316 in write controller 310. The error correction encoder generates write data with error correction encoding applied (i.e., $w^0$ (with EC), $w^1$ (with EC), $w^2$ (with EC), and $w^3$ (with EC)) which are stored in first semiconductor die 322, second semiconductor die 324, third semiconductor die 332, and fourth semiconductor die 334, respectively. In this example, each semiconductor die is able to be written to in parallel, so the writes to first semiconductor die 322, second semiconductor die 324, third semiconductor die 332, and fourth semiconductor die 334 occur in parallel.

In this particular example, each of semiconductor packages 320 and 330 includes multiple semiconductor dice. Semiconductor package 320 includes semiconductor dice 322 and 324 and semiconductor package 330 includes semiconductor dice 332 and 334. In some embodiments, the storage controller which includes write controller 310 may be yet another semiconductor device or package (e.g., different from semiconductor packages 320 and 330). In some embodiments, the semiconductor dice shown herein include solid state storage, such as NAND Flash.

In this particular example, it is known or assumed that each semiconductor die is independent of each other with respect to program failures. There is (for example) no structural dependency between semiconductor die 322 and semiconductor die 324 such that if $w^0$ (with error correction encoding) fails to program, there is a high probability that w' (with error correction encoding) will also fail to program. This makes using (at most) one piece of write data from each die in generating backup write data attractive because it minimizes interdependencies with respect to program failure. As described above, if an XOR is used, the best performance occurs if all of the write data (used to generate a particular piece of backup write data) is independent of each other.

In contrast, some other groups of memory may have interdependencies (e.g., because of shared components or a common structure). For example, each die may include one or more planes, each plane may include one or more blocks, and each block may include one or more pages. Using blocks as an example, it has been observed in some NAND Flash storage systems that (e.g., because of shared circuitry for selecting and/or programming NAND Flash cells) two blocks in the same semiconductor die are related or interdependent. As such, in such systems, selecting two pieces of write data from two different blocks (but on the same semiconductor die) to use in generating backup write data may be undesirable because it does not optimize performance in the event of a program failure.

Figure 3B:
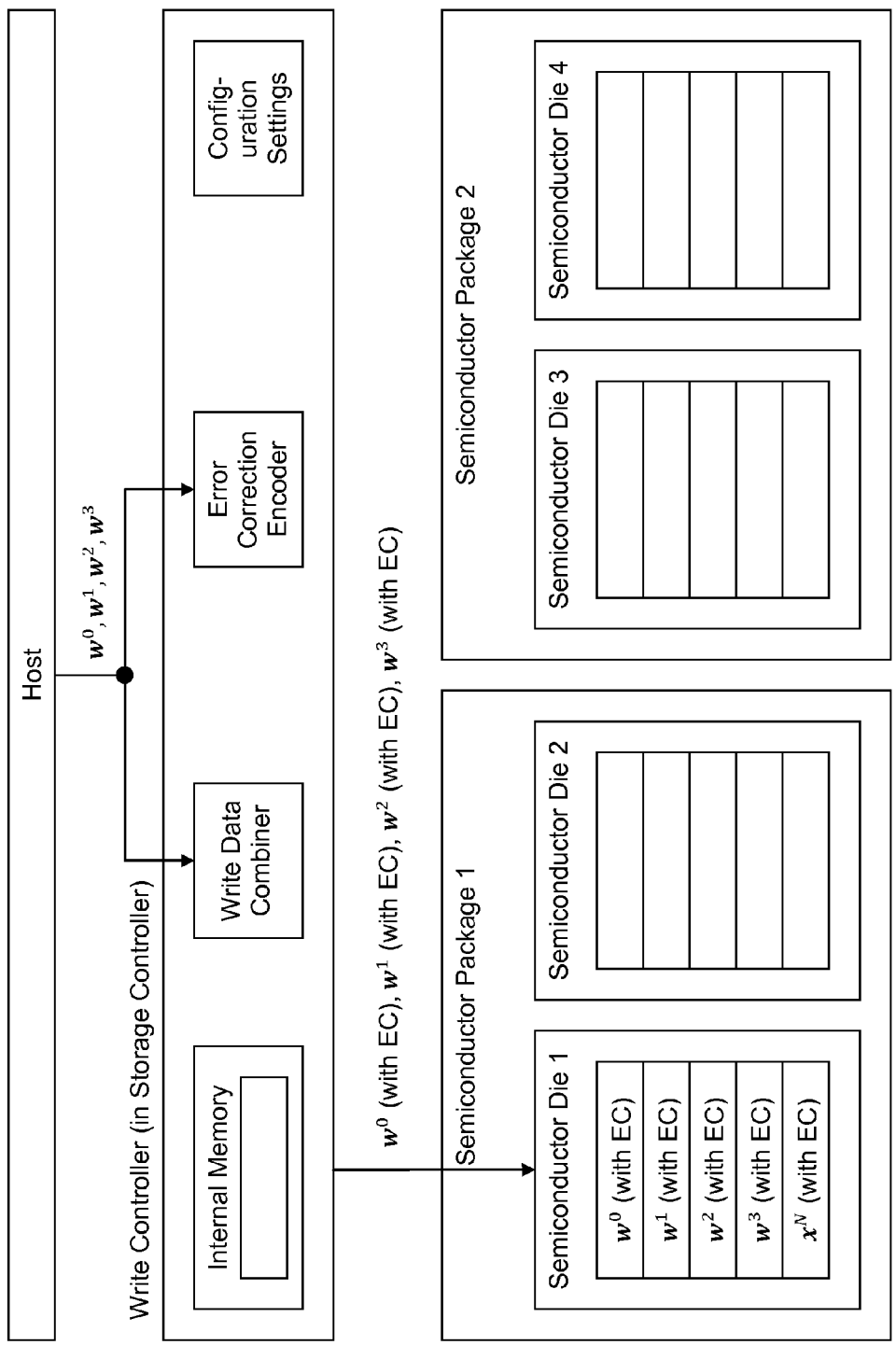
FIG. 3B is a system diagram showing an embodiment of a write controller, where backup write data is stored on the same semiconductor device as the associated write data.

FIG. 3B is a system diagram showing an embodiment of a write controller, where backup write data is stored on the same semiconductor device as the associated write data. As is shown in this example, backup write data and the write data associated with it may be stored on the same storage device (in this example, the same semiconductor die). Naturally, FIGS. 3A and 3B are merely exemplary and are not intended to be limiting.

Returning to FIG. 1, a variety of steps may follow. The following figures describe a variety of exemplary processes which may follow FIG. 1.

Figure 4:
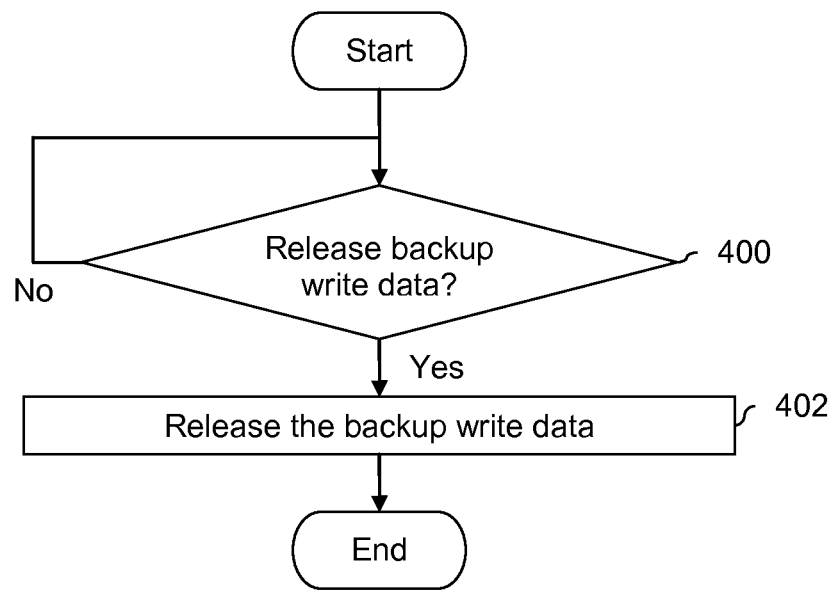
FIG. 4 is a flowchart illustrating an embodiment of a process for cleaning up backup write data.

FIG. 4 is a flowchart illustrating an embodiment of a process for cleaning up backup write data. In the example shown, the process is performed by a write controller, such as write controller 310 in FIG. 3A. In some embodiments, this process follows the process shown in FIG. 1. At 400, it is determined whether to release the backup write data. If so, the backup write data is released at 402.

In one example of the determination at step 400, suppose that each of semiconductor dice 322, 324, 332, and 334 in FIG. 3A returns a status after each program instruction (e.g., success or fail). In one example, if each of semiconductor dice 322, 324, 332, and 334 returns a successful status for $w^0$ (with error correction encoding), $w^1$ (with error correction encoding), $w^2$ (with error correction encoding), and $w^3$ (with error correction encoding), respectively, then the backup write data is discarded (e.g., either from internal memory 312 or semiconductor die 322).

In another example of the determination at step 400, suppose that a later program can ruin an earlier, successful program. Again using FIG. 3A as an example, suppose that each piece of write data (with error correction encoding applied) comprises a page and each of semiconductor dice 322, 324, 332, and 334 includes four pages. Suppose that $w^0$ (with error correction encoding), $w^1$ (with error correction encoding), $w^2$ (with error correction encoding), and $w^3$ (with error correction encoding) are all successfully written. However, a write to each of the second pages causes the data stored in the first pages to be adversely affected (e.g., because of shared circuitry or nearby circuitry). In some embodiments, the backup write data associated with all of the first pages is stored until all of the first pages and all of the second pages have been successfully programmed. To continue the example, the backup write data associated with the second pages is kept until all of the first pages, all of the second pages, and all of the third pages have been successfully programmed. In this example, it is assumed that only the nearest page above (if any) and the nearest page below (if any) can affect a given page. In other words, backup write data is not released until: (1) a successful indication is returned for each piece of write data in a first plurality and (2) a successful indication is returned for each piece of write data in a second plurality, wherein each piece of write data in the second plurality is adjacent to a piece of write data in the first plurality.

In yet another example of the determination at step 400, no successful program signal is sent to a write controller (e.g., the storage only indicates when there is a program failure). In some such embodiments, a timeout is used to determine when to delete backup write data at 400. For example, there may be some system specification which limits the maximum amount of time that a semiconductor die can indicate a program failure to a write controller and the timeout is based on that system specification (e.g., after the last piece of write data in a group has been sent, plus the maximum time for indicating a program failure, plus some margin).

Figure 5:
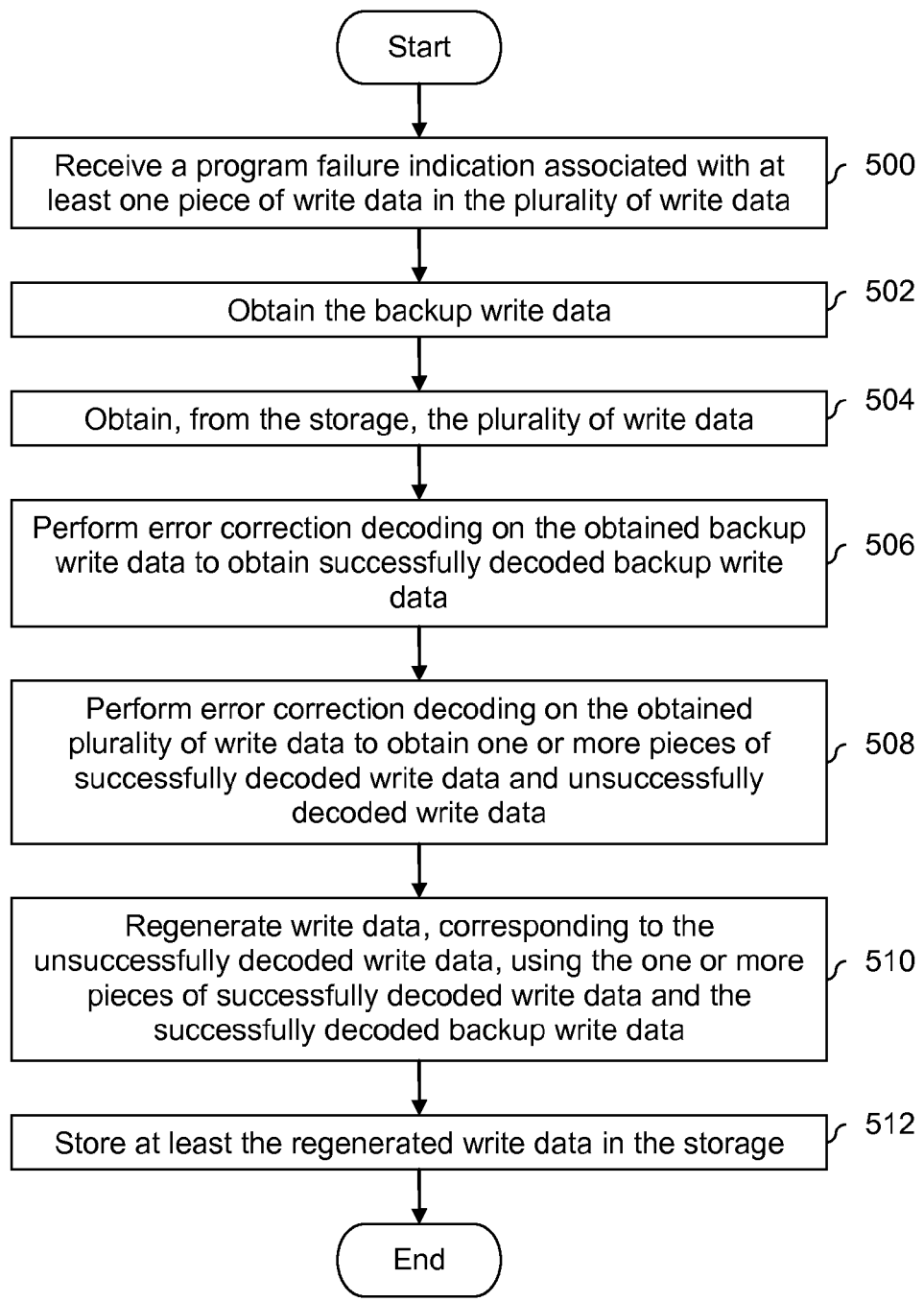
FIG. 5 is a flowchart illustrating an embodiment of a process for using backup write data to recover from a program failure.

FIG. 5 is a flowchart illustrating an embodiment of a process for using backup write data to recover from a program failure. In some embodiments, the process is performed by write controller 310 in FIG. 3A and/or FIG. 5 follows FIG. 1. In this particular example, the backup write data and the plurality of write data are error correction encoded before being stored.

At 500, a program failure indication associated with at least one piece of write data in the plurality of write data is received. For example, any one of semiconductor dice 322, 324, 332, or 334 in FIG. 3A may send a program failure indication to write controller 310.

At 502, the backup write data is obtained. For example, in FIG. 3A, the backup write data with error correction encoding applied (i.e., $x^N$ (with EC)) is obtained from either internal memory 312 or semiconductor die 322.

At 504, the plurality of write data is obtained from the storage. For example, in FIG. 3A, $w^0$ (with error correction encoding applied), $w^1$ (with error correction encoding applied), $w^2$ (with error correction encoding applied), and $w^3$ (with error correction encoding applied) are obtained from semiconductor die 322, semiconductor die 324, semiconductor die 332, and semiconductor die 334, respectively.

At 506, error correction decoding is performed on the obtained backup write data to obtain successfully decoded backup write data. For example, a parity check matrix may be able to detect if all errors have been removed from a codeword. If so, the decoding is declared to be successful. If the parity check matrix indicates that some errors remain in the codeword, then decoding is unsuccessful. In some embodiments, multiple iterations or rounds of decoding are performed before decoding is declared to be successful or not.

At 508, error correction decoding is performed on the obtained plurality of write data to obtain one or more pieces of successfully decoded write data and unsuccessfully decoded write data. In some embodiments, an error correction decoder (not shown in FIG. 3A) used at step 506 and/or step 508 is part of a read controller (not shown in FIG. 3A).

At 510, write data, corresponding to the unsuccessfully decoded write data, is regenerated using the one or more pieces of successfully decoded write data and the successfully decoded backup write data. An example of this is described in further detail below. At 512, at least the regenerated write data is stored in the storage.

In some applications, it is required that other write data (e.g., in addition to the write data which failed to program and/or which was not able to be successfully decoded) be moved to a new location in storage and so step 512 includes storing other write data in the storage (e.g., the one or more pieces of successfully decoded write data). For example, when a program failure occurs, it is assumed that location and nearby locations in storage are of poor quality and so nearby write data (even if no program failure occurred) is preemptively moved to other, presumably better areas of the storage.

For clarity, FIG. 5 shows the scenario where there is only one piece of write data which is unable to be successfully decoded at step 508. In some embodiments, the process shown in FIG. 5 includes a check (e.g., during or after step 508) to check if (at most) one piece of write data is unable to be successfully decoded. If two or more pieces of write data are unable to be successfully decoded, then some program failure signal may be issued (e.g., from write controller 310 in FIG. 3A to host 300) and steps 510 and 512 are skipped.

Figure 6:
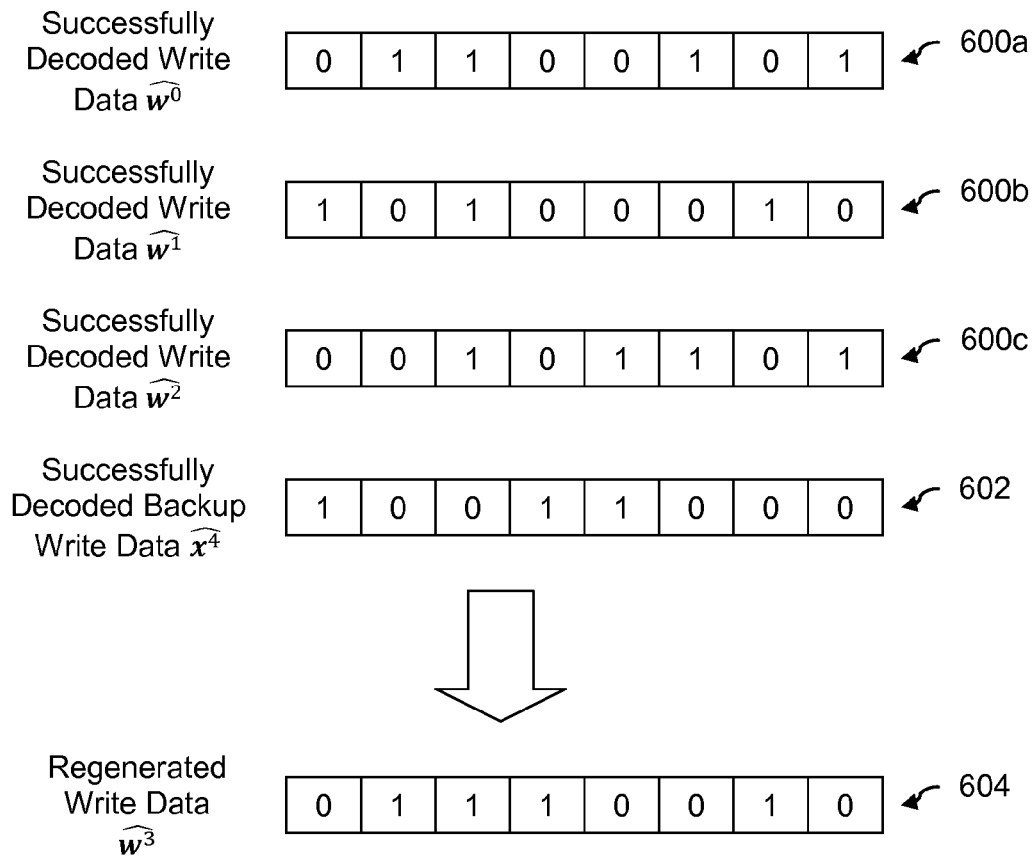
FIG. 6 is a diagram showing an embodiment of regenerated write data.

FIG. 6 is a diagram showing an embodiment of regenerated write data. In the example shown, four pieces of write data are XORed to obtain backup write data. In the example shown, the first three pieces of write data are able to be successfully error correction decoded (600a-600c). The fourth piece of write data is not able to be successfully decoded.

Since the backup write data is generated using an XOR and three of the four pieces of write data used to generate the backup write data are able to be successfully decoded, the fourth piece of write data can be regenerated. In other words, the regenerated write data 604 is regenerated using successfully decoded write data 600a-600c and successfully decoded backup write data 602. For example, for the first bit, $\widehat{w_0^3}$ is selected to be 0 since $\widehat{x_0^4}$ = XOR ($\widehat{w_0^0}$, $\widehat{w_0^1}$, $\widehat{w_0^2}$, $\widehat{w_0^3}$)→1=XOR (0, 1, 0, $\widehat{w_0^3}$)→ $\widehat{w_0^3}$=0. For the second bit, $\widehat{w_1^3}$ is selected to be 1 since $\widehat{x_1^4}$ = XOR($\widehat{w_1^0}$, $\widehat{w_1^1}$, $\widehat{w_1^2}$, $\widehat{w_1^3}$)→0=XOR(1, 0, 0, $\widehat{w_1^3}$)→ $\widehat{w_1^3}$=1, and so on.

As described above, in some embodiments, backup write data is stored externally on solid state storage. In some such embodiments, it may be desirable to change a configuration setting associated with programming or writing to solid state storage in order to mitigate the performance impact or cost of writing backup write data to the external solid state storage. The following figures show some examples of this.

Figure 7:
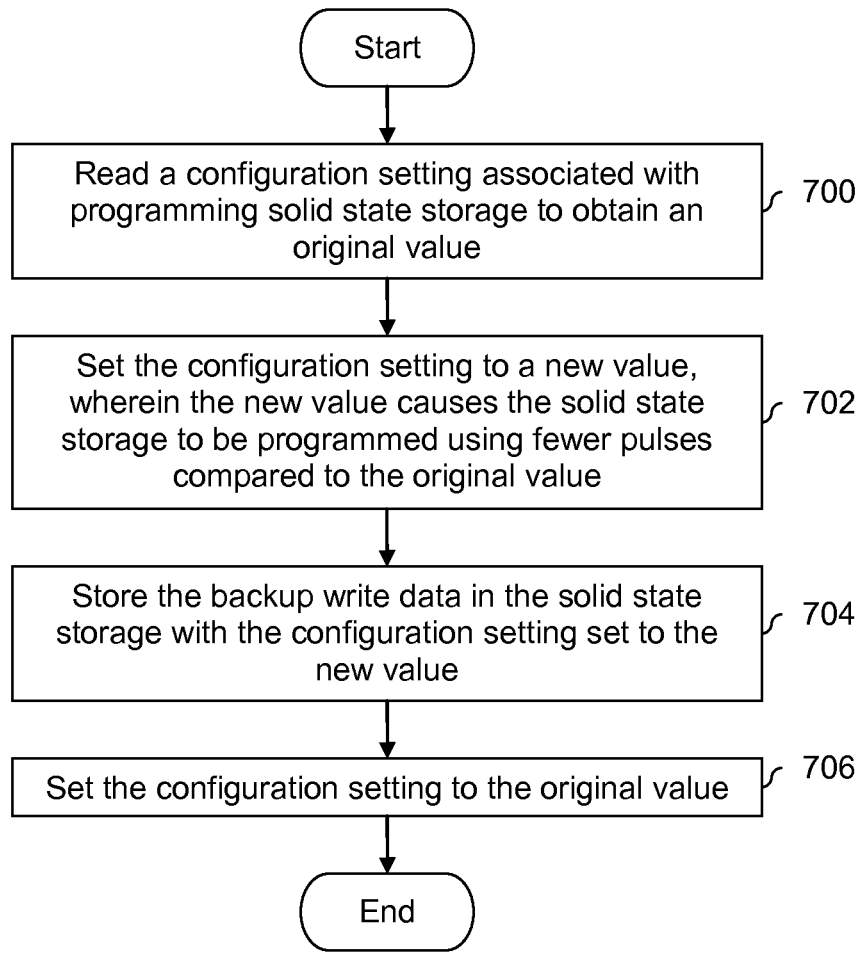
FIG. 7 is a flowchart illustrating an embodiment of a process for changing a configuration setting associated with programming solid state storage.

FIG. 7 is a flowchart illustrating an embodiment of a process for changing a configuration setting associated with programming solid state storage. In some embodiments (e.g., where backup write data is stored on solid state storage), step 108 in FIG. 1 includes the process shown herein.

At 700, a configuration setting associated with programming solid state storage is read to obtain an original value. For example, configuration settings 318 in FIG. 3A may comprise registers via which a variety of settings associated with write controller 310 are set. In one example of step 700, a configuration setting associated with programming solid state storage is read from configuration settings 318 in FIG. 3A. In some embodiments, the value obtained at step 700 corresponds to or is associated with a voltage level or voltage amount associated with a (e.g., single) program pulse.

At 702, the configuration setting is set to a new value, wherein the new value causes the solid state storage to be programmed using fewer pulses compared to the original value. In one example, the configuration setting corresponds to the voltage level or voltage amount associated with a program pulse and the new value is twice as large as the original value (e.g., so that a single program pulse is now twice as large as it used to be).

At 704, the backup write data is stored in the solid state storage with the configuration setting set to the new value. For example, in FIG. 3A, x" (with error correction encoding applied) is stored in semiconductor die 322 with configuration settings 318 configured as described in step 702.

At 706, the configuration setting is set to the original value. For example, the appropriate configuration setting in 318 in FIG. 3A is returned to its original state or value.

Figure 8:
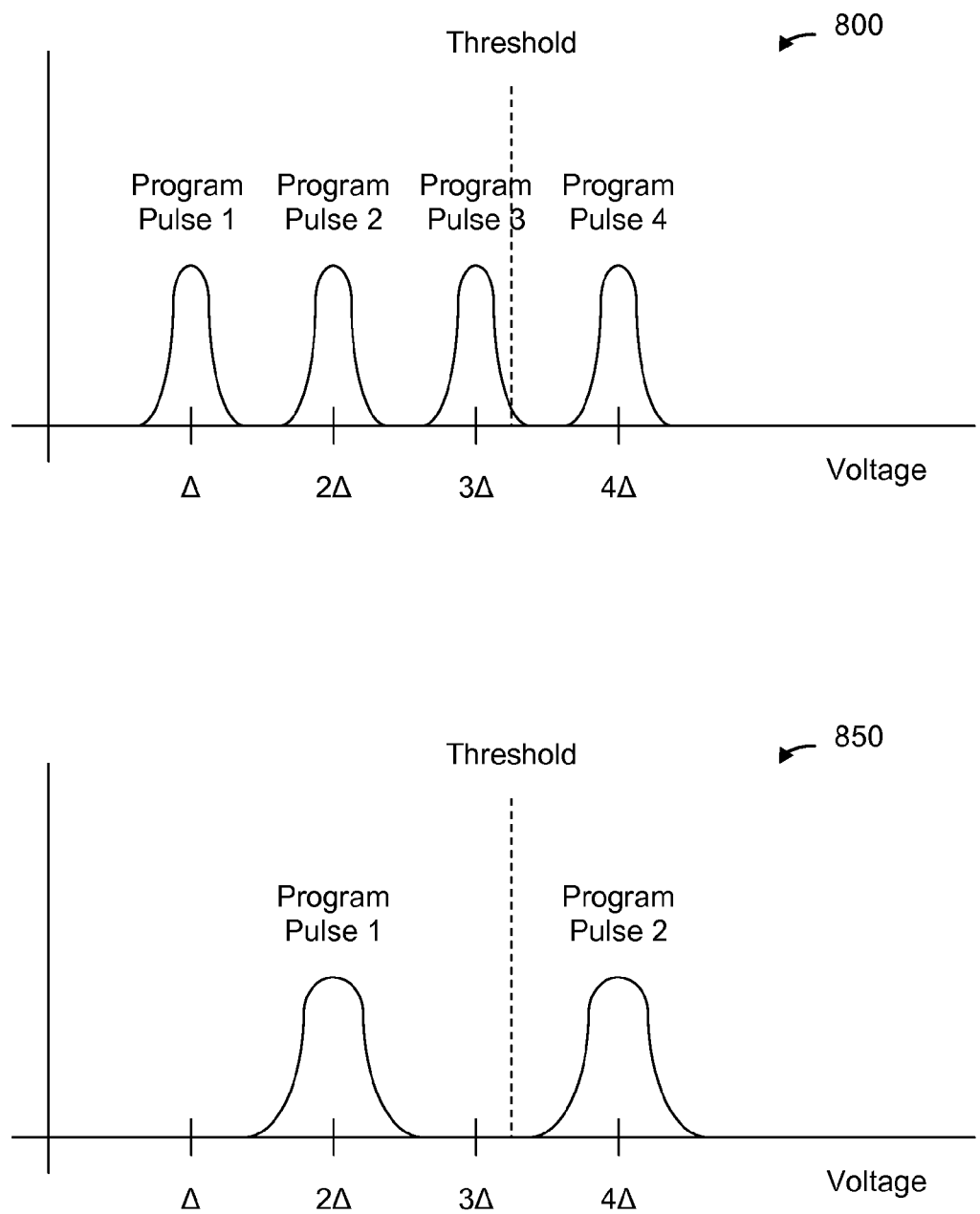
FIG. 8 is a diagram showing an embodiment of program pulses when a configuration setting associated with programming solid state storage is set to various values.

FIG. 8 is a diagram showing an embodiment of program pulses when a configuration setting associated with programming solid state storage is set to various values. In the example shown, diagram 800 shows programming when the configuration setting is set to a value corresponding to smaller program pulses and diagram 850 shows programming when the configuration setting is set to a value corresponding to larger program pulses. For convenience, the size of a single program pulse in diagram 850 is twice as large as the size of a single program pulse in diagram 800.

In diagram 800, each program pulse is approximately A units of voltage. (Note that since each program pulse will not be exactly the same amount, the program pulses in diagrams 800 and 850 are shown as distributions.) A stored voltage which is greater than the threshold is desired, which in the case of diagram 800 requires four program pulses.

In diagram 850, a stored voltage which is greater than the same threshold is also desired, but because each program pulse is roughly 2A units of voltage, only two program pulses are required. Fewer program pulses correspond to less time to program a cell, so it may be desirable to use the configuration setting shown in diagram 850 (as opposed to diagram 800) in order to mitigate the cost or performance degradation associated with storing backup write data in solid state storage.

The downside to using larger program pulses is that larger program pulses cause the solid state storage to break down sooner. In other words, using larger program pulses causes the cells in solid state storage to break down sooner, making those cells programmed with larger pulses more "leaky" compared to cells which are programmed with smaller pulses. "Leaky" cells in solid state storage are not desirable because over time, the stored information (which is in the form of voltage) leaks out of the cells. Conceptually, this may be thought of as a glass with a small crack. Given enough time, the glass with will lose significant amounts of water through the crack. Certain types of data (e.g., photographs, music, or videos) may be stored for years on solid state storage without being refreshed, so retention is an important consideration for user data.

However, this trade-off between retention and programming time may be acceptable for backup write data. Backup write data only needs to be kept (as an example) on the order of microseconds, not years. If user data and backup write data are kept segregated (e.g., so that the cells in solid state storage which store backup write data can be "thrashed" since it is assured that no user data will be kept in the "thrashed" cells), then larger program pulses (e.g., as shown in diagram 850) may be used to store backup write data and user/host write data is stored using smaller program pulses (e.g., as shown in diagram 800).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a processor; and
    a memory coupled with the processor, wherein the memory is configured to provide the processor with instructions which when executed cause the processor to:
        receive a plurality of write data;
        combine the plurality of write data to obtain backup write data;
        store the plurality of write data in storage;
        release, on a storage controller, the plurality of write data without waiting for a confirmation associated with writing the plurality of write data to the storage; and
        store the backup write data.

2. The system of claim 1, wherein the system includes a semiconductor device, including one or more of the following: a field-programmable gate array (FPGA) or an application-specific integrated circuit (ASIC).

3. The system of claim 1, wherein the plurality of write data is received together in a batch.

4. The system of claim 1, wherein the instructions for combining include instructions for combining the plurality of write data incrementally to obtain backup write data.

5. The system of claim 1, wherein the backup write data is stored on one or more of the following: the same storage as the plurality of write data, storage that is external to the storage controller, or storage that is internal to the storage controller.

6. The system of claim 1, wherein the storage in which the plurality of write data is stored includes solid state storage.

7. The system of claim 1, wherein the memory is further configured to provide the processor with instructions which when executed cause the processor to:
    determine whether to release the backup write data; and
    in the event it is determined to release the backup write data, release the backup write data.

8. The system of claim 7, wherein it is determined to release the backup write data in the event a successful indication is returned for each piece of write data in the plurality of write data.

9. The system of claim 7, wherein:
    the plurality of write data is a first plurality of write data; and
    it is determined to release the backup write data in the event: (1) a successful indication is returned for each piece of write data in the first plurality of write data and (2) a successful indication is returned for each piece of write data in a second plurality of write data, wherein each piece of write data in the second plurality of write data is adjacent to a piece of write data in the first plurality of write data.

10. The system of claim 7, wherein it is determined to release the backup write data in the event a timeout is exceeded.

11. The system of claim 1, wherein the memory is further configured to provide the processor with instructions which when executed cause the processor to:
    receive a program failure indication associated with at least one piece of write data in the plurality of write data;
    obtain the backup write data;
    obtain, from the storage, the plurality of write data;
    perform error correction decoding on the obtained backup write data to obtain successfully decoded backup write data;
    perform error correction decoding on the obtained plurality of write data to obtain one or more pieces of successfully decoded write data and unsuccessfully decoded write data;
    regenerate write data, corresponding to the unsuccessfully decoded write data, using the one or more pieces of successfully decoded write data and the successfully decoded backup write data; and
    store at least the regenerated write data in the storage.

12. The system of claim 1, wherein the instructions for storing the backup write data include instructions for:
    reading a configuration setting associated with programming solid state storage to obtain an original value;
    setting the configuration setting to a new value, wherein the new value causes the solid state storage to be programmed using fewer pulses compared to the original value;
    storing the backup write data in the solid state storage with the configuration setting set to the new value; and
    setting the configuration setting to the original value.

13. A method, comprising:
- receiving a plurality of write data;
- using a processor to combine the plurality of write data to obtain backup write data;
- storing the plurality of write data in storage;
- releasing, on a storage controller, the plurality of write data without waiting for a confirmation associated with writing the plurality of write data to the storage; and
- storing the backup write data.

14. The method of claim 13, wherein the method is performed by a semiconductor device, including one or more of the following: a field-programmable gate array (FPGA) or an application-specific integrated circuit (ASIC).

15. The method of claim 13 further comprising:
- determining whether to release the backup write data; and
- in the event it is determined to release the backup write data, releasing the backup write data.

16. The method of claim 15, wherein it is determined to release the backup write data in the event a successful indication is returned for each piece of write data in the plurality of write data.

17. The method of claim 15, wherein:
- the plurality of write data is a first plurality of write data; and
- it is determined to release the backup write data in the event: (1) a successful indication is returned for each piece of write data in the first plurality of write data and (2) a successful indication is returned for each piece of write data in a second plurality of write data, wherein each piece of write data in the second plurality of write data is adjacent to a piece of write data in the first plurality of write data.

18. The method of claim 15, wherein it is determined to release the backup write data in the event a timeout is exceeded.

19. The method of claim 13 further comprising:
- receiving a program failure indication associated with at least one piece of write data in the plurality of write data;
- obtaining the backup write data;
- obtaining, from the storage, the plurality of write data;
- perform error correction decoding on the obtained backup write data to obtain successfully decoded backup write data;
- performing error correction decoding on the obtained plurality of write data to obtain one or more pieces of successfully decoded write data and unsuccessfully decoded write data;
- regenerating write data, corresponding to the unsuccessfully decoded write data, using the one or more pieces of successfully decoded write data and the successfully decoded backup write data; and
- storing at least the regenerated write data in the storage.

20. The method of claim 13 further comprising:
- reading a configuration setting associated with programming solid state storage to obtain an original value;
- setting the configuration setting to a new value, wherein the new value causes the solid state storage to be programmed using fewer pulses compared to the original value;
- storing the backup write data in the solid state storage with the configuration setting set to the new value; and
- setting the configuration setting to the original value.

21. A computer program product, the computer program product being embodied in a non-transitory computer readable storage medium and comprising computer instructions for:
- receiving a plurality of write data;
- combining the plurality of write data to obtain backup write data;
- storing the plurality of write data in storage;
- releasing, on a storage controller, the plurality of write data without waiting for a confirmation associated with writing the plurality of write data to the storage; and
- storing the backup write data.

* * * * *